Patented Aug. 23, 1932

1,873,013

UNITED STATES PATENT OFFICE

JOHN D. MORGAN, OF SOUTH ORANGE, NEW JERSEY, ASSIGNOR TO DOHERTY RESEARCH COMPANY, OF NEW YORK, N. Y., A CORPORATION OF DELAWARE

HIGH TEMPERATURE TRANSFER MATERIAL

No Drawing. Application filed April 8, 1930. Serial No. 442,715.

This invention relates to a refractory material for high temperature apparatus, and has for its object the production of a material capable of continued use at high temperatures and which shall have high heat diffusivity and a high co-efficient of heat conductivity.

According to the preferred form of the invention a mixture of approximately 50 parts of graded silicon carbide aggregate, 43 parts of fused chromic oxide, 5 parts of chromic oxide powder, and the equivalent of about 2% of $Cr_2O_3$ in the form of chromium sulphate or potassium bi-chromate is molded to the desired form and needs but to be fired to a temperature of approximately 1800° F., at which temperature it acquires sufficient hardness and durability to withstand temperatures of the order of 2800° F.

The refractory material so formed has, compared with other non-metallic refractory materials, a high co-efficient of heat conductivity, it being more than one-half that of cast iron at temperatures of 2000° and over.

The composition is therefore useful in connection with high temperature furnaces and in other places where a highly refractory material must be used under conditions where high heat conductivity is desired.

The material may be formed into bricks or molded into the shape of a desired article.

While the proportions stated above for the various materials are the most desirable, it is found that these proportions may be varied over wide limits. Good results are obtained if 20-80 parts of silicon carbide are used together with 13-73 parts fused chromic oxide and 4-6 parts of chromic oxide powder.

Having thus described the invention what is claimed as new is:

1. An article of manufacture containing silicon carbide and fused chromic oxide.

2. An article of manufacture containing 20 to 80 parts silicon carbide, 13 to 73 parts fused chromic oxide and 4 to 6 parts chromic oxide powder.

3. An article of manufacture containing 50 parts silicon carbide, 43 parts fused chromic oxide, and 5 parts chromic oxide powder.

In testimony whereof I affix my signature.

JOHN D. MORGAN.